United States Patent

Rouviere et al.

[11] Patent Number: 5,804,651
[45] Date of Patent: Sep. 8, 1998

[54] HEAT SENSITIZABLE LATEX

[75] Inventors: Fabienne Arlette Francoise Rouviere, Choisel; Pascale Francine Jeanne Muller, Bullion, both of France

[73] Assignee: The Goodyear Tire & Rubber Company, Akron, Ohio

[21] Appl. No.: 46,972

[22] Filed: Mar. 24, 1998

Related U.S. Application Data

[62] Division of Ser. No. 811,479, Mar. 5, 1997.

[60] Provisional application No. 60/013,164, Mar. 11, 1996.

[51] Int. Cl.[6] .................................................... C08L 35/04
[52] U.S. Cl. .......................................... 524/832; 524/827
[58] Field of Search ..................................... 524/832, 827

[56] References Cited

U.S. PATENT DOCUMENTS 4,202,809   5/1980   Eash ........................................ 524/269

Primary Examiner—Jeffrey T. Smith
Assistant Examiner—Wu C. Cheng
Attorney, Agent, or Firm—Alvin T. Rockhill

[57] ABSTRACT

This invention discloses heat sensitizable latices and a process for synthesizing heat sensitizable latices. This invention more specifically discloses a process for preparing a heat sensitizable latex which comprises the steps of (1) polymerizing at least one conjugated diolefin monomer in an aqueous polymerization medium by free radical polymerization in the presence of an emulsifier system which is comprised of a fatty ethoxylated monomaleate and optionally an alkyl monomaleate to produce a first latex composition; and (2) adding a water soluble organically modified polysiloxane to the first latex composition to produce the heat sensitizable latex. The present invention further discloses a heat sensitizable latex composition which is comprised of (1) at least one rubbery polymer; (2) water; (3) an emulsifier system which is comprised of a fatty ethoxylated monomaleate and optionally an alkyl monomaleate; and (4) at least one water-soluble organically modified polysiloxane.

20 Claims, No Drawings

HEAT SENSITIZABLE LATEX

This is a Divisional of application Ser. No. 08/811,479, filed on Mar. 5, 1997, presently pending, which claims the priority of United States Provisional Patent Application Serial No. 60/013,164, filed on Mar. 11, 1996.

BACKGROUND OF THE INVENTION

Latex is commonly utilized as a chemical binder for nonwoven fabrics to provide the nonwoven fabric with desired physical characteristics, such as higher strength. The nonwoven fabric is generally dipped into the latex to saturate it with the latex. If the nonwoven fabric has a thickness of less than about 3 mm (millimeters), it can simply be dried to remove the water from the latex; this leaves the polymer from the latex dispersed throughout the nonwoven fabric. However, in cases where the nonwoven fabric is thicker than about 3 mm, the water from the latex tends to become entrapped within the nonwoven fabric. To overcome this problem, heat sensitizable latex is commonly utilized as the chemical binder for nonwoven fabrics which are thicker than about 3 mm.

After being saturated with heat sensitizable latex, nonwoven fabrics can be heated to above the coagulation temperature of the latex to induce coagulation. After coagulation occurs, the water can be squeezed out of the nonwoven fabric which eliminates the problem of water being entrapped within the nonwoven fabric. The rubbery polymer which is dispersed throughout the nonwoven fabric can then, of course, be cured to attain the desired physical characteristics.

The use of heat sensitizable latices as chemical binders for nonwoven fabrics is well known. For instance, U.S. Pat. No. 4,001,162 and U.S. Pat. No. 4,535,111 disclose that heat-sensitized latex mixtures may be used for impregnating nonwoven materials and for producing hollow bodies, for example gloves, by the dip process. U.S. Pat. No. 4,535,111 also indicates that water-soluble organically modified polysiloxanes, such as oxalkylated polysiloxanes, can act as heat sensitizing agents. Moreover, numerous publications disclose other heat sensitizing agents, such as polyvinylalkylethers, polyacetals, cation-active substances, polyetheramines and polyethylene oxides. U.S. Pat. No. 4,250,071 discloses that mixtures of ammonia and alkoxylated polysiloxanes can be used as heat sensitizers for rubber latices and that heat sensitizable latices thus obtained are stable so that no coagulation occurs even in the event of prolonged storage or under mechanical stressing.

Heat sensitizable latex is normally synthesized by polymerizing one or more conjugated diolefin monomers, at least one carboxyl group containing monomer, and optionally additional monomers which are copolymerizable therewith in an emulsion which contains both an anionic emulsifier and a nonionic emulsifier. Accordingly, such heat sensitizable latices generally contain both an anionic emulsifier and a nonionic emulsifier as well as a rubbery polymer which contains a carboxyl group containing monomer.

SUMMARY OF THE INVENTION

By utilizing the techniques of this invention, latices which are capable of being rendered heat sensitizable can by synthesized without including a carboxyl group containing monomer in the monomer charge composition. Accordingly, the need to incorporate a carboxyl group containing monomer into the rubbery polymer of the latex is eliminated. The need to include both an anionic emulsifier and a nonionic emulsifier in the polymerization medium is also eliminated.

This invention more specifically discloses a process for preparing a heat sensitizable latex which comprises the steps of (1) polymerizing at least one conjugated diolefin monomer in an aqueous polymerization medium by free radical polymerization in the presence of an emulsifier system which is comprised of a fatty ethoxylated monomaleate and optionally an alkyl monomaleate to produce a first latex composition; and (2) adding a water-soluble organically modified polysiloxane to the first latex composition to produce the heat sensitizable latex.

The subject invention also reveals a latex which can be rendered heat sensitizable which is comprised of (1) at least one rubbery polymer, (2) water and (3) an emulsifier system which is comprised of a fatty ethoxylated monomaleate and optionally an alkyl monomaleate.

The present invention further discloses a heat sensitizable latex composition which is comprised of (1) at least one rubbery polymer, (2) water, (3) an emulsifier system which is comprised of a fatty ethoxylated monomaleate and optionally an alkyl monomaleate and (4) at least one water-soluble organically modified polysiloxane.

DETAILED DESCRIPTION OF THE INVENTION

The latices of this invention are made by a free radical emulsion polymerization process. In the procedure used, at least one conjugated diolefin monomer is polymerized in a aqueous polymerization medium. It is also possible to copolymerize the conjugated diolefin monomer with additional monomers which are copolymerizable therewith, such as vinyl aromatic monomers, acrylonitrile or alkyl propenoic acid ester monomers. The conjugated diolefin monomer will normally contain from 4 to about 8 carbon atoms with 1,3-butadiene and isoprene being typical examples.

Virtually any vinyl aromatic monomer which is known to polymerize in free radical systems can be copolymerized with the conjugated diolefin monomers. Such vinyl aromatic monomers typically contain from 8 to 20 carbon atoms. Usually, the vinyl aromatic monomer will contain from 8 to 14 carbon atoms. Some representative examples of vinyl aromatic monomers that can be utilized include styrene, 1-vinyl napthalene, 2-vinyl napthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene, and the like. Styrene is generally the most preferred vinyl aromatic monomer.

Alkyl propenoic acid ester monomers can also be copolymerized with the conjugated diolefin monomers to produce the latex. The alkyl propenoic acid ester monomers that can be used generally have the structural formula:

wherein R represents an alkyl group containing from 1 to 10 carbon atoms ($R=C_nH_{2n+1}$ with n being an integer from 1 to 8) and wherein R' represents a hydrogen atom or a methyl group ($R'=C_nH_{2n+1}$ with n being 0 or 1). In cases where R' is a methyl group, the alkyl propenoic acid ester monomer can be more fully described as being an alkyl methacrylate monomer. Methyl methacrylate, ethyl methacrylate, propyl methacrylate and n-butyl methacrylate are representative examples of alkyl methacrylate monomers which could be used. The alkyl group in the alkyl propenoic acid ester monomer will preferably contain from 1 to 4 carbon atoms with alkyl groups which contain 4 carbon atoms being most preferred. Accordingly, methyl acrylate, ethyl acrylate, propyl acrylate and butyl acrylate are preferred alkyl propenoic acid ester monomers with butyl acrylate being the most preferred. The alkyl groups in such alkyl propenoic acid ester monomers can be straight chained or branched. Thus, normal-propyl acrylate, isopropyl acrylate, normal-butyl acrylate or tertiary-butyl acrylate can be employed. Normal-butyl acrylate is a particularly preferred monomer.

The first step of the polymerization process is carried out by adding the appropriate monomers and a very specific emulsifier system to water in order to form an aqueous polymerization medium. Polymerization of the monomers is then initiated with a free radical generator.

The ratio between the total amount of monomers present in the charge composition and water can range between about 0.2:1 and about 1.2:1. It is generally preferred for the ratio of monomers including alkylmonomaleate to water in the charge composition to be within the range of about 0.8:1 and about 1.1:1. For instance, it is normally very satisfactory to utilize a ratio of monomers including alkylmonomaleate to water in the charge composition which is within the range of 0.8:1 to about 1:1.

The aqueous polymerization medium will also contain an emulsifier system which is comprised of a fatty ethoxylated monomaleate and optionally an alkyl monomaleate. The fatty ethoxylated monomaleates which can be used will normally be of the structural formula:

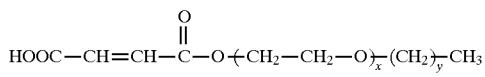

wherein x represents an integer from 1 to about 30 and wherein y represents an integer from 5 to about 20. It is normally preferred from x to represent an integer from 2 to 20 and for y to represent an integer from 8 to 16. It is generally most preferred for x to represent an integer from 3 to 8 and for y to represent an integer from 10 to 12.

The alkyl monomaleates which can be used will normally be of the structural formula:

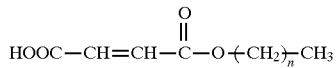

wherein n represents an integer from 0 to 7. It is normally preferred for n to represent an integer from 1 to 4 with 1 or 2 being most preferred. It is the very most preferred for n to represent 1.

The fatty ethoxylated monomaleate will normally be added to the aqueous polymerization medium in an amount which is within the range of about 0.5 to about 6 phm (parts by weight per 100 parts by weight of monomers including alkylmonomaleate). Thus, it will typically be present in the latex in an amount which is within the range of about 0.5 to about 6 phdl (parts by weigh per 100 parts by weight of dry latex). It is normally preferred for the fatty ethoxylated monomaleate to be present in an amount which is within the range of about 1 phm to about 4 phm. It is generally more preferred for the fatty ethoxylated monomaleate to be present in an amount which is within the range of about 2 phm to about 3 phm.

The alkyl monomaleate will normally be added to the aqueous polymerization medium in an amount which is within the range of about 0 to about 8 phm. It is normally preferred for the alkyl monomaleate to be present in an amount which is within the range of about 1 phm to about 5 phm. It is generally more preferred for the alkylmonomaleate to be present in an amount which is within the range of about 3 phm to about 4 phm.

The precise amount of emulsifier system required in order to attain optimal results will, of course, vary with the polymer being synthesized, with the polymerization conditions, and with the specific emulsifier being used. For example, the polymerization reaction rate increases with higher levels of the fatty ethoxylated monomaleate. Accordingly, lower reaction temperatures will be utilized with increasing levels of the fatty ethoxylated monomaleate. In any case, persons skilled in the art will be able to easily ascertain the specific amount of emulsifier required in order to attain optimal results.

Essentially any type of free radical generator can be used to initiate the free radical emulsion polymerization. For example, free radical generating chemical compounds, ultra-violet light or radiation can be used. In order to ensure a satisfactory polymerization rate, uniformity and a controllable polymerization, free radical generating chemical agents are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Persulfate initiators, such as potassium persulfate and ammonium persulfate are especially useful in such aqueous emulsion polymerizations.

The amount of initiator employed will vary with the monomers being polymerized and with the desired molecular weight of the polymer being synthesized. Higher molecular weights are achieved by utilizing smaller quantities of the initiator and lower molecular weights are attained by employing larger quantities of the initiator. However, an a general rule from 0.005 to 1 phm (parts by weight per 100 parts by weight of monomer) of the initiator will be included in the reaction mixture. In the case of metal persulfate, initiators most commonly from 0.1 to 0.5 phm will be employed in the polymerization medium.

The free radical emulsion polymerization will typically be carried out at a temperature which is within the range of about 5° C. to about 70° C. It is generally more typical for the polymerization to be carried out at a temperature which is within the range of about 15° C. to about 55° C.

The polymerization step is allowed to continue until a very high conversion of monomers to polymer is attained. Typically the conversion reached will be in excess of about 96 percent. More typically monomer conversions in excess of about 98 percent will be attained with it being preferred for an essentially quantitative conversion in excess of 99 percent to be realized.

The solids content which is reached will normally be in the range of about 35 percent to about 55 percent. It is normally preferred for the latex to have a solids content which is within the range of about 40 percent to about 50 percent. However, the latex will normally be diluted with additional water subsequent to polymerization but before being utilized in an application as a heat sensitizable latex. The heat sensitizable latex will normally be diluted to a solids content which is within the range of about 5 to about 40 percent.

The latex is made to be heat sensitizable by adding at least one water-soluble organically modified polysiloxane to the latex. Such water-soluble organically modified polysiloxanes are commercially available from a variety of sources. For instance, Hansa Textilchemie sells a water-soluble organically modified polysiloxane as Hansa® Coagulant 4710.

The water-soluble organically modified polysiloxane will typically be added in an amount which is within the range of about 0.1 to 1 phdl (parts by weight per 100 parts by weight of dry latex). The water-soluble organically modified polysiloxane will typically be added to the latex in an amount which is within the range of about 0.2 to 0.5 phdl. Generally, the coagulation temperature of the heat sensitizable latex decreases with increasing quantities of polysiloxane. The coagulation temperature of the latex also decreases with increasing levels of solids contents.

Various other compounding ingredients will also typically be added to the heat sensitizable latex to provide the nonwoven fabric being treated with the desired physical properties. For example, fillers, thickening agents, pigments, curatives and accelerators will typically be added to the heat sensitizable latex. It can then be utilized as a chemical binder for virtually any type of natural or synthetic nonwoven fabric. For example, it can be employed to treat nonwoven fabrics which are comprised of polypropylene, polyethylene, cotton, wool or polyester, and the like.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

A fatty ethoxylated monomaleate (Brij30 monomaleate) was synthesized by mixing 39.4 g of fatty ethoxylated alcohol having the structural formula $CH_3-(CH_2)_{11}-(O-CH_2-CH_2-)_4-OH$ with 10.7 g of maleic anhydride in a glass flask under gentle stirring and maintaining the flask at a temperature of 50° C overnight.

An alkyl monomaleate (ethyl monomaleate) was also synthesized by mixing 21.1 g of ethanol with 45 g of maleic anhydride in a glass flask under gentle stirring and maintaining the flask at a temperature of 50° C. overnight.

Then a latex was synthesized utilizing the techniques of this invention. In the procedure used, a aqueous phase was prepared by heating 1677 g of water to a temperature of 60° C. and then adding 48 g of the Brij30 monomaleate, 64 g of the ethyl monomaleate, and 4.8 g of naphthalene sulfonate (a dispersion agent). The mixture was stirred and its pH was adjusted to be within the range of 10 to 11 by the addition of potassium hydroxide. The stirring was continued until the solution became transparent and was of a very low viscosity. It was then charged into a 5-liter stainless steel reactor and cooled to a temperature of 35° C.

Then, 576 g of acrylonitrile and 4.8 g of tridodecylmercaptan were charged into the reactor. This was followed by the charging of 96 g of a 5 percent solution of triethanolamine into the reactor. After the triethanolamine was charged into the reactor, vacuum was applied and 960 g of 1,3-butadiene was charged into the reactor.

The reactor was equipped with three paddles for stirring its contents which were operated at a speed of 400 rpm. After about 15 minutes of mixing at a temperature of 35° C., polymerization was initiated by injecting 160 g of a 5 percent potassium persulfate solution into the reactor. The polymerization was allowed to continue for a period of about 8 hours after which the latex made was discharged from the reactor. Residual 1,3-butadiene monomer was removed from the latex by stirring it in a flask under aspiration for several hours.

The latex made was determined to have a solids content of 46 percent, a pH of 7.4, a surface tension of 46 mN/m, a Brookfield viscosity (spindle #1 at 60 rpm) of 25 mpa·sec, and a particle size of 140 nm. The nitrile rubber in the latex was determined to have a glass transition temperature of −22° C.

A heat sensitizable latex was then made by mixing 434 g of the latex with 1.5 g of sodium paraffin sulfonate, 1.5 g of fatty ethoxylated alcohol, 25 g of a 40 percent zinc oxide (ZnO) dispersion, and 0.2 g of Hansa® Coagulant 4710 polysiloxane. Water was then added to adjust the latex to a final solids content of 30 percent with the latex being blended for 1 hour in a 1-liter beaker equipped with a magnetic stirred.

Then 15 g of the heat sensitizable latex was added to a 25-ml beaker which was placed in a bath which was maintained at a temperature of 60° C. The temperature at which the heat sensitizable latex coagulated was then observed and recorded as 43° C.

In another experiment, the amount of Hansa® Coagulant 4710 polysiloxane added was increased to a level of 0.3 g. In that experiment, the heat sensitizable latex made coagulated at a temperature of 36° C.

COMPARATIVE EXAMPLE 2

The polymerization procedure utilized in Example 1 was repeated in this experiment except for the fact that only 3 phm of octylmonomaleate and no Brij 30 monomaleate was utilized in the emulsifier system. However, in this experiment, a very low conversion of only about 52 percent resulted. It should be noted that in Example 1 the emulsifier system contained 3 phm of Brij30 monomaleate and 4 phm of ethyl monomaleate.

COMPARATIVE EXAMPLE 3

The polymerization procedure utilized in Example 1 was repeated in this experiment except for the fact that 4 phm of octylmonomaleate and 5 phm of acetoacetoxymonomaleate was utilized as the emulsifier system. In this experiment, overheating occurred and the latex was not evaluated.

COMPARATIVE EXAMPLE 4

The polymerization procedure utilized in Example 3 was repeated in this experiment except for the fact that the level of octylmonomaleate was decreased to 3 phm. The reduced level of the octylmonomaleate decreased the polymerization rate which kept the polymerization from overheating. However, the latex made was not heat sensitizable without the post addition of a large amount of both nonionic and anionic emulsifiers.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a heat sensitizable latex which comprises the steps of (1) polymerizing at least one conjugated diolefin monomer in an aqueous polymerization medium by free radical polymerization in the presence of an emulsifier system which is comprised of a fatty ethoxylated monomaleate and optionally an alkyl monomaleate to produce a first latex composition, with the proviso that the emulsifier system is void of anionic emulsifiers; and (2) adding a water-soluble organically modified polysiloxane to the first latex composition to produce the heat sensitizable latex.

2. A process as specified in claim 1 wherein the polymerization is carried out at a temperature which is within the range of about 5° C. to about 70° C.; and wherein the ratio between the total amount of monomers present in the charge composition and water is within the range between about 0.2:1 and about 1.2:1.

3. A process as specified in claim 2 wherein the emulsifier system consists only of the fatty ethoxylated monomaleate and the alkyl monomaleate.

4. A process as specified in claim 1 wherein the ethoxylated monomaleate is present in an amount which is within the range of about 0.5 phm to about 6 phm.

5. A process as specified in claim 4 wherein the alkyl monomaleate is present in the latex in an amount which is within the range of 0 to 8 phm.

6. A process as specified in claim 5 wherein the fatty ethoxylated monomaleate is of the structural formula:

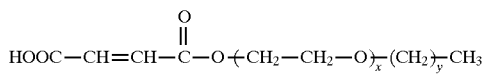

wherein x represents an integer from 1 to about 30 and wherein y represents an integer from 5 to about 20; and wherein the alkyl monomaleate is of the structural formula:

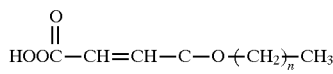

wherein n represents an integer from 0 to 4.

7. A process as specified in claim 6 wherein the polymerization is conducted at a temperature which is within the range of about 5° C. to about 70° C.

8. A process as specified in claim 7 wherein the fatty ethoxylated monomaleate is present in an amount which is within the range of about 1 phm to about 4 phm; and wherein the alkyl monomaleate is present in an amount which is within the range of about 1 phm to about 5 phm.

9. A process as specified in claim 8 wherein the fatty ethoxylated monomaleate is of the structural formula:

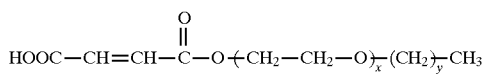

wherein x represents an integer from 2 to about 20 and wherein y represents an integer from 8 to about 16; and wherein the alkyl monomaleate is of the structural formula:

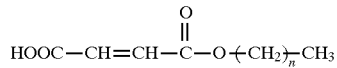

wherein n represents an integer from 1 to 2.

10. A process as specified in claim 9 wherein the polymerization is carried out to a monomer conversion of at least about 96 percent.

11. A process as specified in claim 10 wherein the fatty ethoxylated monomaleate is present in an amount which is within the range of about 2 phm to about 3 phm; and wherein the alkyl monomaleate is present in an amount which is within the range of about 3 phm to about 4 phm.

12. A process as specified in claim 11 wherein the fatty ethoxylated monomaleate is of the structural formula:

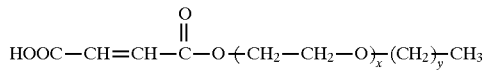

wherein x represents an integer from 3 to about 8 and wherein y represents an integer from 10 to about 12; and wherein the alkyl monomaleate is of the structural formula:

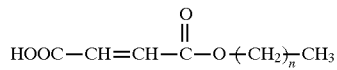

wherein n represents the integer 1.

13. A process as specified in claim 12 wherein the heat sensitizable latex has a solids content which is within the range of about 5 percent to about 40 percent.

14. A process as specified in claim 13 wherein from about 0.1 phdl to about 1 phdl of the water-soluble organically modified polysiloxane is added.

15. A process as specified in claim 14 wherein the polymerization is conducted at a temperature which is within the range of about 15° C. to about 55° C.

16. A process as specified in claim 15 wherein the polymerization is carried out to a monomer conversion of at least about 98 percent.

17. A process as specified in claim 15 wherein the polymerization is carried out to a monomer conversion of at least about 99 percent.

18. A process as specified in claim 1 wherein 1,3-butadiene and acrylonitrile are copolymerized to produce the first latex composition.

19. A process as specified in claim 18 wherein from about 0.1 phdl to about 1 phdl of the water-soluble organically modified polysiloxane is added.

20. A process as specified in claim 19 wherein the ethoxylated monomaleate is present in an amount which is within the range of about 0.5 phm to about 6 phm.

* * * * *